US008161745B2

(12) United States Patent
Dörle et al.

(10) Patent No.: US 8,161,745 B2
(45) Date of Patent: Apr. 24, 2012

(54) TURBOCHARGER

(75) Inventors: Klaus-Peter Dörle, Mehlingen (DE); Oliver Schumnig, Gundersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 485 days.

(21) Appl. No.: 12/444,757

(22) PCT Filed: Oct. 23, 2007

(86) PCT No.: PCT/EP2007/009192
§ 371 (c)(1),
(2), (4) Date: Apr. 8, 2009

(87) PCT Pub. No.: WO2008/055588
PCT Pub. Date: May 15, 2008

(65) Prior Publication Data
US 2010/0047054 A1 Feb. 25, 2010

(30) Foreign Application Priority Data
Nov. 9, 2006 (DE) .......................... 10 2006 052 944

(51) Int. Cl.
*F02B 33/44* (2006.01)
(52) U.S. Cl. ....................................... 60/605.1; 60/605.2
(58) Field of Classification Search ................. 60/605.1, 60/605.2, 602, 611; 123/564
See application file for complete search history.

(56) References Cited

U.S. PATENT DOCUMENTS

| 3,462,071 | A | * | 8/1969 | Garve | 415/116 |
| 4,008,572 | A | * | 2/1977 | Woollenweber, Jr. | 60/602 |
| 4,689,960 | A | * | 9/1987 | Schroder et al. | 60/607 |
| 5,059,091 | A | * | 10/1991 | Hatfield | 415/11 |
| 5,137,003 | A | * | 8/1992 | Kyoya et al. | 123/564 |
| 5,173,021 | A | * | 12/1992 | Grainger et al. | 415/119 |
| 5,355,677 | A | * | 10/1994 | Hawkins et al. | 60/609 |
| 5,461,860 | A | * | 10/1995 | Schegk | 60/611 |
| 6,223,534 | B1 | * | 5/2001 | Erdmann et al. | 60/602 |
| 2004/0055299 | A1 | | 3/2004 | Bernard | |
| 2007/0057213 | A1 | * | 3/2007 | Noelle | 251/61.3 |
| 2008/0216795 | A1 | | 9/2008 | Dietz et al. | |
| 2008/0289610 | A1 | * | 11/2008 | Nguyen-Schaefer et al. | 123/559.1 |

FOREIGN PATENT DOCUMENTS

| DE | 102005008657 A1 | 8/2006 |
| EP | 0123515 A1 | 10/1984 |
| EP | 1400670 A1 | 3/2004 |
| WO | 2005042941 A1 | 5/2005 |
| WO | 2005068803 A1 | 7/2005 |
| WO | 2006029814 A1 | 3/2006 |

* cited by examiner

*Primary Examiner* — Thanh Lam
(74) *Attorney, Agent, or Firm* — William G. Anderson; Stephen A. Pendorf; Patent Central LLC

(57) ABSTRACT

The invention relates to a turbocharger (1) having a turbine (2); and having a compressor (3) connected to the turbine (2) by means of a bearing housing (4), the compressor comprising a compressor housing (5), which has a reference surface (BF) perpendicular to a turbocharger axis ($A_L$), and a valve flange (6) equipped with a valve seat (11) for a wastegate valve and a connecting channel (9) to a compressor inlet (7), wherein the valve flange (6) has a flange surface (8) that is disposed at a calculable angle ($\alpha$) to the reference surface (BF) in a tilted manner, and wherein the connecting channel (9) has a channel axis ($A_K$), which is disposed at a calculable angle ($\beta$) in a tilted manner.

7 Claims, 2 Drawing Sheets

TURBOCHARGER

FIELD OF THE INVENTION

The invention relates to a turbocharger.

In turbocharged spark-ignition engines, in which the generic turbocharger can be used, the throttle flap which serves to predefine the engine load is fitted downstream of the compressor of the turbocharger in the air collector. When the throttle pedal is released, the throttle flap closes and the compressor of the turbocharger would, as a result of its mass inertia, feed air against a virtually closed volume. This would have the result that the compressor could no longer feed continuously, and backflows would form. The compressor would pump. The rotational speed of the turbocharger would therefore decrease very suddenly.

BACKGROUND OF THE INVENTION

To prevent this, turbochargers can be provided with an air recirculation valve (also referred to as an overrun air recirculation valve) which, beyond a certain underpressure, opens a connecting duct in a pressure-controlled manner by means of a spring-loaded valve element, which connecting duct recirculates the air to the compressor inlet. It is thereby possible for the rotational speed of the turbocharger to remain at a high level, and for charge pressure to be immediately available again in the event of a subsequent acceleration process.

In known turbochargers having an air recirculation valve of said type, the compressor housing, which has a valve flange for the air recirculation valve, is produced primarily by gravity die casting or sand casting. It is also known to produce such valve housings by pressure die casting, wherein it is however necessary here for a plurality of molded parts to be joined together, since the geometries of the individual molded parts must be selected such that said molded parts can be demolded in the pressure-die-casting process. However, this increases the design expenditure and therefore the production costs.

SUMMARY OF THE INVENTION

It is therefore an object of the present invention to create a turbocharger, the compressor housing of which can be produced in one piece in a cost-effective manner by means of pressure die casting.

A turbocharger as described herein can achieve this object. The turbocharger (1) has a turbine (2) and a compressor (3) which is connected to the turbine (2) by means of a bearing housing (4). The compressor (3) includes a compressor housing (5). The compressor housing (5) has a reference surface (BF) that is perpendicular to a turbocharger axis ($A_L$). The compressor housing (5) has a valve flange (6), which is provided with a valve seat (11), for an overrun air recirculation valve, and also a connecting duct (9) to a compressor inlet (7). The valve flange (6) has a flange surface (8) which is arranged so as to be inclined by an angle ($\alpha$) with respect to the reference surface (BF), which angle ($\alpha$) is defined as follows: $\alpha = \arctan((G-F)/(I-V))$. F is the spacing from the center of the cross section of the spiral to the turbocharger axis ($A_L$). G is the spacing from the central point of the valve opening (10) to the turbocharger axis ($A_L$). I is the spacing of the valve flange (6) between the reference side or the reference surface (BF) and the central point of the valve opening (10). V is the spacing from the point of intersection of the valve flange axis ($A_{VF}$) with the center of the cross section of the spiral to the reference surface (BF). The connecting duct (9) has a duct axis ($A_K$) which is arranged so as to be inclined by an angle ($\beta$) which is defined as follows:

$$\beta = \arctan\left[\frac{I - \left(\frac{A}{2} \cdot \sin\alpha\right) - E}{G + \left(\frac{A}{2} \cdot \cos\alpha\right) - R}\right]$$

In this equation, A is the inner diameter of the valve flange (6). E is the contour height formed by the spacing from the reference surface BF to the plane of the blade leading edges of the compressor wheel. R is the spacing from the inner wall of the inlet pipe (7) to the turbocharger axis $A_L$.

The turbocharger can have additional features that can provide advantages. For instance, the angles ($\alpha, \beta$) can be greater than 0 degrees. The angles ($\alpha, \beta$) can be acute angles. In one embodiment, the angle ($\alpha$) can lie in a range from 0 degrees to 60 degrees, and the angle ($\beta$) can lie in a range from 15 degrees to 60 degrees. In another embodiment, the angle ($\alpha$) can be approximately 12 degrees, and the angle ($\beta$) can be approximately 25 degrees. The compressor housing (5) can be a pressure-die-cast housing.

As a result of the connecting duct of the compressor housing, which connecting duct leads from the compressor spiral to the compressor inlet, and the flange surface of the valve flange for the air recirculation valve being arranged at an angle of greater than 0° with respect to the reference side of the compressor housing, it is possible during the pressure-die-casting process to use so-called slides which can be pulled out of the compressor housing after the casting process on account of said angles being set to values of greater than 0°, which makes it possible for the compressor housing of the turbocharger according to the invention to be produced in one piece in a cost-effective manner by means of pressure die casting.

Embodiments can also be directed to a compressor housing (5) adapted for connection to a turbine housing of a turbocharger (1) via a bearing housing. The turbocharger has an associated turbocharger axis ($A_L$). The compressor housing (5) has a reference surface (BF) perpendicular to the turbocharger axis ($A_L$). The compressor housing (5) further has a valve flange (6) for an overrun air recirculation valve. The compressor housing (5) also has a connecting duct (9) to a compressor inlet (7). The valve flange (6) has a flange surface (8) which is arranged so as to be inclined by an angle ($\alpha$) with respect to the reference surface (BF). The angle ($\alpha$) is defined as follows: $\alpha = \arctan((G-F)/(I-V))$. F is the spacing from the center of the cross section of the spiral to the turbocharger axis ($A_L$). G is the spacing from the central point of the valve opening (10) to the turbocharger axis $A_L$. I is the spacing of the valve flange (6) between the reference side or the reference surface BF and the central point of the valve opening (10). V is the spacing from the point of intersection of the valve flange axis $A_{VF}$ with the center of the cross section of the spiral to the reference surface BF. The connecting duct (9) has a duct axis ($A_K$) which is arranged so as to be inclined by an angle $\beta$ which is defined as follows:

$$\beta = \arctan\left[\frac{I - \left(\frac{A}{2} \cdot \sin\alpha\right) - E}{G + \left(\frac{A}{2} \cdot \cos\alpha\right) - R}\right]$$

In this equation, A is the inner diameter of the valve flange (6). E is the contour height formed by the spacing from the reference surface BF to the plane of the blade leading edges of the compressor wheel. R is the spacing from the inner wall of the inlet pipe (7) to the turbocharger axis $A_L$. Further details, advantages and features of the present invention can be gathered from the following description of an exemplary embodiment on the basis of the drawing, in which:

DETAILED DESCRIPTION OF THE INVENTION

Figure 1:
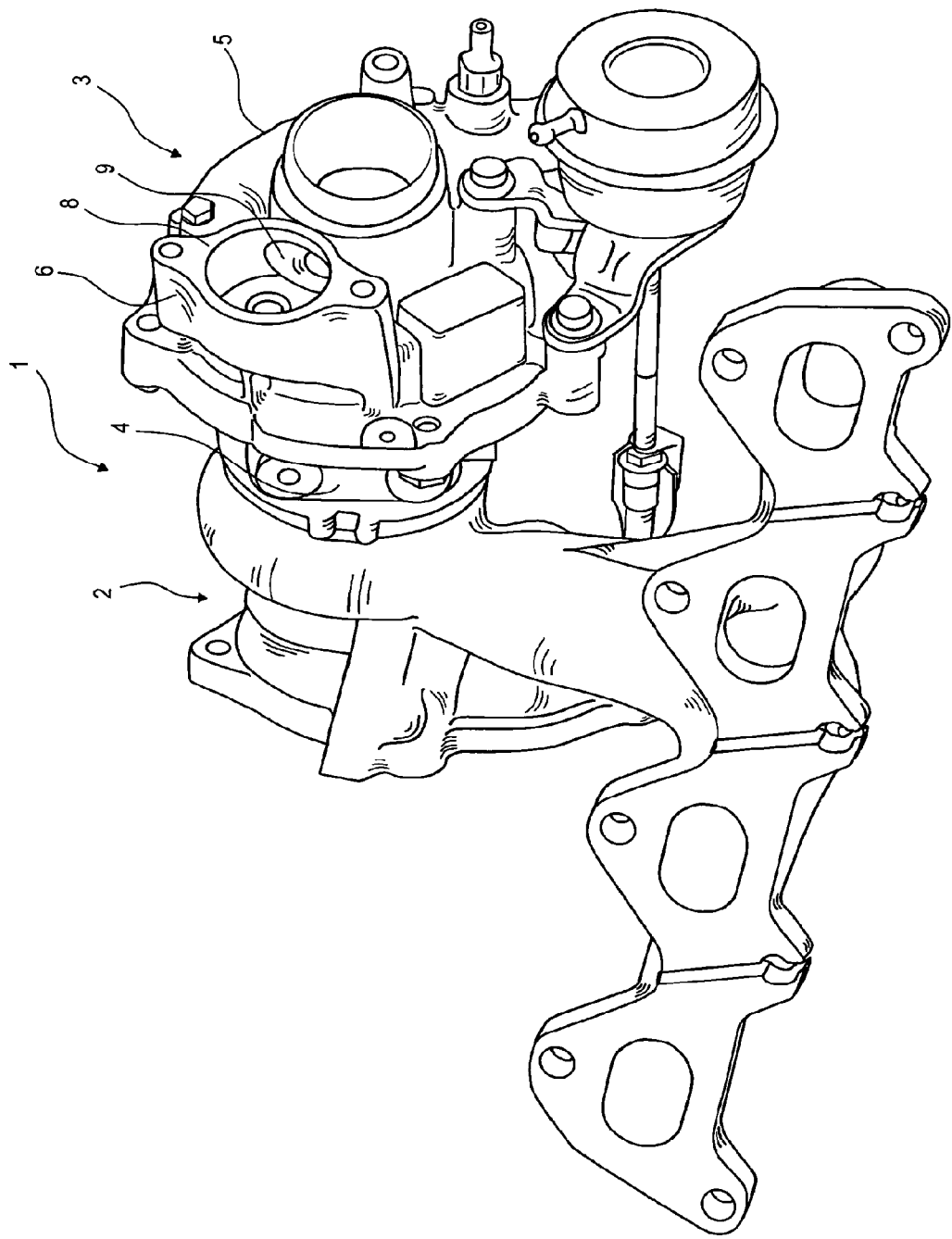
FIG. 1 shows a perspective illustration of a turbocharger according to the invention in order to explain the basic design thereof.

FIG. 1 serves to illustrate the basic components of a turbocharger 1 according to the invention, which turbocharger 1 comprises, as is conventional, a turbine 2 and a compressor 3 which is connected to the turbine 2 by means of a bearing housing 4. All the other conventional components are of course also provided, such as a rotor shaft, the compressor wheel and the turbine wheel, but said components are not explained in any more detail below since they are not necessary for explaining the principles of the present invention.

Figure 2:
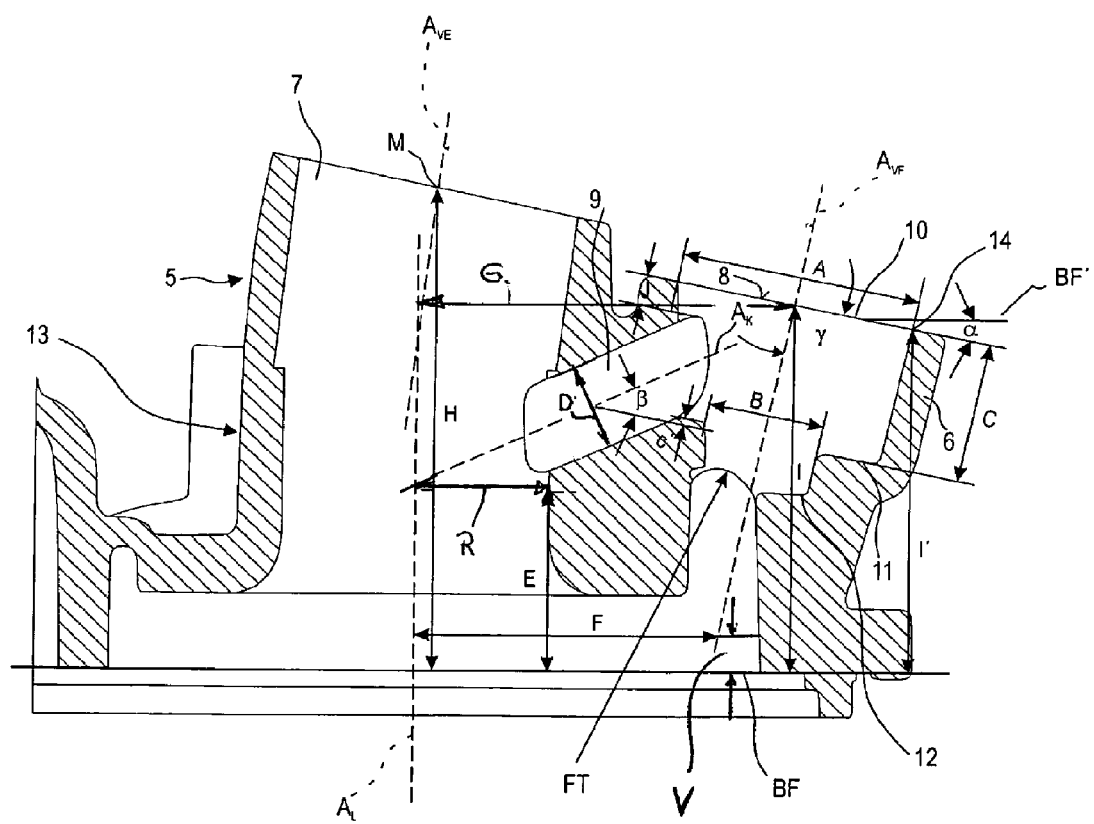
FIG. 2 shows a sectioned illustration through the compressor housing according to the invention for a turbocharger according to FIG. 1.

FIG. 2 shows a sectioned illustration of the compressor housing 5 of the compressor 3.

The compressor housing 5 has a reference surface BF which is arranged perpendicular to the turbocharger axis $A_L$ and which delimits the spiral axially in the direction of the bearing housing side.

The compressor housing 5 also has a valve flange 6 to which the air recirculation valve, which was explained in the introduction and which is not illustrated in any more detail in FIG. 2, can be fastened. For this purpose, the valve flange 6 has a flange surface 8 in which an inlet opening 10 is arranged, which inlet opening 10 is adjoined by a connecting duct 9 to the compressor inlet 7. The valve flange 6 also has a valve seat 11 for the closing element (not shown) of the air recirculation valve.

As shown in FIG. 2, the duct axis $A_K$ is arranged at an angle $\beta$ with respect to the valve seat.

Furthermore, the flange surface 8 is arranged at an angle $\alpha$ with respect to the reference surface BF, which angle $\alpha$, like the angle $\beta$, is designed to be greater than 0°, and preferably as an acute angle, in the illustrated embodiment. The line BF' represents a parallel displacement of the reference surface BF in order to be able to illustrate the position of the angle $\alpha$ in a simplified manner.

By selecting the angles $\alpha$ and $\beta$ with angle dimensions of greater than 0°, it is possible to produce the valve housing 5 in one piece by means of pressure die casting since, by means of a corresponding selection of the angles $\alpha$ and $\beta$ of greater than 0°, it is possible for a slide to be arranged in that region of the compressor housing to be cast in which the connecting duct 9 is to be formed, which slide can be removed from the cast valve housing 5 after the casting process.

It has proven to be particularly advantageous for $\beta$ to lie in the range from 15-60° and for $\alpha$ to lie in the range from 0-60°.

Even though the invention has been explained above on the basis of the particularly preferred embodiment according to FIG. 2, it is possible for the angles $\alpha$ and $\beta$ to be calculated in general form with reference to the variables plotted in FIG. 2. Said variables are defined as follows:

α: inclination of the valve flange or pipe 6;
β: inclination of the connecting duct or transverse duct 9;
A: inner diameter of the valve opening 10;
B: inner diameter of an air recirculation valve regulating duct 12;
C: spacing from valve seat 11 to flange surface 8;
D: inner diameter of the connecting duct 9;
E: spacing from the reference surface BF to the point of intersection of the axes $A_K$ and $A_L$, which is predefined by the plane of the blade leading edges of the compressor wheel (not illustrated);
F: spacing from the center of the cross section of the spiral to the turbocharger axis $A_L$;
G: spacing from the central point of the valve opening 10 to the turbocharger axis $A_L$;
I: spacing between the reference side or the reference surface BF and the central point of the valve opening 10;
V: spacing from the point of intersection of the valve flange axis $A_{VF}$ with the center of the cross section of the spiral to the reference surface BF;
R: spacing from the inner wall of the inlet pipe 7 to the turbocharger axis $A_L$ On the basis of said variables, the angles $\alpha$ and $\beta$ can be calculated as follows:

$$\alpha = \arctan((G-F)/(I-V))$$

$$\beta = \arctan\left[\frac{I - \left(\frac{A}{2} \cdot \sin\alpha\right) - E}{G + \left(\frac{A}{2} \cdot \cos\alpha\right) - R}\right]$$

LIST OF REFERENCE SYMBOLS

1 Turbocharger
2 Turbine
3 Compressor
4 Bearing housing
5 Compressor housing
6 Valve flange
7 Compressor inlet
8 Flange surfaces
9 Connecting duct
10 Valve opening
11 Valve seat
12 Regulating duct
13 Intake pipe
14 Demolding edge
BF Reference surface
BF' Parallel displacements of the reference surface BF
$A_L$ Turbocharger axis
$A_K$ Duct axis
$A_{VF}$ Valve flange axis
α, β Angles, preferably 12° and 25° respectively

The invention claimed is:
1. A turbocharger (1)
having a turbine (2); and
having a compressor (3) which is connected to the turbine (2) by means of a bearing housing (4) and which comprises a compressor housing (5), which compressor housing (5) has a reference surface (BF) perpendicular to a turbocharger axis ($A_L$), a valve flange (6), which is provided with a valve seat (11), for an overrun air recirculation valve, and also a connecting duct (9) to a compressor inlet (7),
wherein the valve flange (6) has a flange surface (8) which is arranged so as to be inclined by an angle (α) with respect to the reference surface (BF), which angle (α) is defined as follows:

$$\alpha = \arctan((G-F)/(I-V))$$

where
F: spacing from the center of the cross section of the spiral to the turbocharger axis ($A_L$)
and
G: the spacing from the central point of the valve opening (10) to the turbocharger axis $A_L$
I: the spacing of the valve flange (6) between the reference side or the reference surface BF and the central point of the valve opening (10);
V: the spacing from the point of intersection of the valve flange axis $A_{VF}$ with the center of the cross section of the spiral to the reference surface BF, and
in that the connecting duct (9) has a duct axis ($A_K$) which is arranged so as to be inclined by an angle (β) which is defined as follows:

$$\beta = \arctan\left[\frac{I - \left(\frac{A}{2}\cdot\sin\alpha\right) - E}{G + \left(\frac{A}{2}\cdot\cos\alpha\right) - R}\right]$$

where:
A: is the inner diameter of the valve flange (6),
E: is the contour height formed by the spacing from the reference surface BF to the plane of the blade leading edges of the compressor wheel;
R: is the spacing from the inner wall of the inlet pipe (7) to the turbocharger axis $A_L$.

2. The turbocharger as claimed in claim 1, wherein the angles (α, β) are greater than 0°.

3. The turbocharger as claimed in claim 1, wherein the angles (α, β) are acute angles.

4. The turbocharger as claimed in claim 1, wherein the angle (α) lies in a range from 0° to 60° and the angle (β) lies in a range from 15° to 60°.

5. The turbocharger as claimed in claim 1, wherein the angle (α) is approximately 12° and the angle (β) is approximately 25°.

6. The turbocharger as claimed in claim 1, wherein the compressor housing (5) is a pressure-die-cast housing.

7. A compressor housing (5) adapted for connection to a turbine housing of a turbocharger (1) via a bearing housing, the turbocharger having a turbocharger axis ($A_L$), the compressor housing (5):
having a reference surface (BF) perpendicular to the turbocharger axis ($A_L$);
having a valve flange (6) for an overrun air recirculation valve; and
having a connecting duct (9) to a compressor inlet (7),
wherein the valve flange (6) has a flange surface (8) which is arranged so as to be inclined by an angle (α) with respect to the reference surface (BF), which angle (α) is defined as follows:

$$\alpha = \arctan((G-F)/(I-V))$$

where
F: spacing from the center of the cross section of the spiral to the turbocharger axis ($A_L$)
and
G: the spacing from the central point of the valve opening (10) to the turbocharger axis $A_L$
I: the spacing of the valve flange (6) between the reference side or the reference surface BF and the central point of the valve opening (10);
V: the spacing from the point of intersection of the valve flange axis $A_{VF}$ with the center of the cross section of the spiral to the reference surface BF, and
in that the connecting duct (9) has a duct axis ($A_K$) which is arranged so as to be inclined by an angle (β) which is defined as follows:

$$\beta = \arctan\left[\frac{I - \left(\frac{A}{2}\cdot\sin\alpha\right) - E}{G + \left(\frac{A}{2}\cdot\cos\alpha\right) - R}\right]$$

where:
A: is the inner diameter of the valve flange (6),
E: is the contour height formed by the spacing from the reference surface BF to the plane of the blade leading edges of the compressor wheel;
R: is the spacing from the inner wall of the inlet pipe (7) to the turbocharger axis $A_L$.

* * * * *